United States Patent
Li

(10) Patent No.: US 9,553,760 B2
(45) Date of Patent: Jan. 24, 2017

(54) METHOD, DEVICE, AND SYSTEM FOR DUAL-UPLINK TANGENT RING CONVERGENCE

(71) Applicant: Huawei Technologies Co., Ltd., Shenzhen (CN)

(72) Inventor: Yi Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 331 days.

(21) Appl. No.: 14/315,541

(22) Filed: Jun. 26, 2014

(65) Prior Publication Data

US 2014/0307539 A1  Oct. 16, 2014

Related U.S. Application Data

(63) Continuation of application No. PCT/CN2013/072759, filed on Mar. 15, 2013.

(51) Int. Cl.
  *G01R 31/08* (2006.01)
  *H04L 12/24* (2006.01)
  (Continued)

(52) U.S. Cl.
  CPC ............ *H04L 41/0659* (2013.01); *H04L 1/08* (2013.01); *H04L 1/22* (2013.01)

(58) Field of Classification Search
  USPC ....... 370/216, 217, 218, 221, 225, 252, 389, 370/392
  See application file for complete search history.

(56) References Cited

U.S. PATENT DOCUMENTS 6,766,482 B1   7/2004  Yip et al.
8,730,963 B1 *  5/2014  Grosser, Jr. ........... H04L 12/462
                                                370/219
(Continued)

FOREIGN PATENT DOCUMENTS

CN    101035047 A    9/2007
CN    101252503 A    8/2008
       (Continued)

OTHER PUBLICATIONS

Foreign Communication From a Counterpart Application, PCT Application No. PCT/CN2013/072759, English Translation of International Search Report dated Dec. 5, 2013, 2 pages.
(Continued)

*Primary Examiner* — Ricky Ngo
*Assistant Examiner* — Christine Ng
(74) *Attorney, Agent, or Firm* — Conley Rose, P.C.

(57) ABSTRACT

A method, device, and system for dual-uplink tangent ring convergence, where ports on a network device are classified into conjugate ports and non-conjugate ports. When receiving an entry update packet from a first port or perceiving a state change of a first port, when it is determined that the first port of the network device is a conjugate port, the network device clears a media access control (MAC) entry and an Address Resolution Protocol (ARP) entry that use the first port as an outbound interface and clears all MAC entries that use a non-conjugate port as an outbound interface, in a MAC table and an ARP table of the network device. In this way, traffic interruption can be avoided, wherein a failure of one dual-uplink tangent ring does not cause an entry of one or more other normal dual-uplink tangent rings to be cleared/updated.

21 Claims, 6 Drawing Sheets

Receiving, by a first network device, an entry update packet from a first port of the first network device, or perceiving that a state of a first port of the first network device changes — 201

Determining whether the first port of the first network device is a conjugate port — 202

If it is determined that the first port of the first network device is a conjugate port, clearing all entries that use the first port of the first network device as an outbound interface and are in an MAC table and an ARP table of the first network device, and clearing all entries that use a non-conjugate port of the first network device as an outbound interface and are in the MAC table of the first network device — 203

(51) Int. Cl.
  *H04L 1/08* (2006.01)
  *H04L 1/22* (2006.01)

(56) References Cited

U.S. PATENT DOCUMENTS

| | | | |
|---|---|---|---|
| 2009/0175280 A1* | 7/2009 | Berechya | H04L 12/4625 370/395.53 |
| 2012/0092983 A1* | 4/2012 | Song | H04L 12/462 370/217 |
| 2012/0127854 A1* | 5/2012 | Khetan | H04L 12/4641 370/218 |
| 2013/0003530 A1 | 1/2013 | Davari | |
| 2014/0301185 A1* | 10/2014 | Chen | H04L 12/437 370/225 |
| 2015/0029834 A1* | 1/2015 | Zhang | H04L 45/28 370/225 |

FOREIGN PATENT DOCUMENTS

| | | |
|---|---|---|
| CN | 102932183 A | 2/2013 |
| GB | 2449178 A | 11/2008 |
| WO | 2008151906 A2 | 12/2008 |

OTHER PUBLICATIONS

Foreign Communication From a Counterpart Application, PCT Application No. PCT/CN2013/072759, Written Opinion dated Dec. 5, 2013, 5 pages.

Foreign Communication From a Counterpart Application, European Application No. 13861532.3, Extended European Search Report dated Dec. 12, 2014, 6 pages.

* cited by examiner

METHOD, DEVICE, AND SYSTEM FOR DUAL-UPLINK TANGENT RING CONVERGENCE

CROSS-REFERENCE TO RELATED APPLICATION

This application is a continuation of International Application No. PCT/CN2013/072759, filed on Mar. 15, 2013, which is hereby incorporated by reference in its entirety.

TECHNICAL FIELD

Embodiments of the present invention relate to the field of computer communications, and in particular to, a method, a device, and a system for dual-uplink tangent ring convergence.

BACKGROUND

When a downstream device connects to an upstream device using a single-uplink scheme, a single-point failure is prone to occur and results in service interruption. Therefore, a dual-uplink scheme is generally employed, that is, one downstream device concurrently connects to two upstream devices to avoid the single-point failure and improve network reliability. Though the dual-uplink scheme is capable of improving network reliability, a loop problem is introduced, and a loop needs to be eliminated using a loop-breaking protocol, such as the Spanning Tree Protocol (STP)/Multiple Spanning Tree Protocol (MSTP)/Rapid Spanning Tree Protocol (RSTP), the Rapid Ring Protection Protocol (RRPP), and the smart link (SmartLink) protocol.

However, when multiple downstream network devices are dual-linked to a same pair of upstream network devices, links to the pair of upstream network devices form multiple dual-uplink tangent rings. When virtual local area network (VLAN) deployment is per service per VLAN (PSPV), all links of the multiple dual-uplink tangent rings share one service VLAN. Though loop-breaking protocols can be deployed to prevent traffic from forming a loop in a broadcast domain, a fault in any dual-uplink tangent ring may cause a related entry of one or more other normal dual-uplink tangent rings to be cleared/updated and further cause traffic interruption, because the existing loop-breaking protocols clear/update a related entry on a VLAN basis. When there are a large number of users, many entry updates may be performed, which in turn leads to long-time service interruption.

SUMMARY

In view of this, embodiments of the present invention provide a method, device, and system for dual-uplink tangent ring convergence, which may solve a problem of traffic interruption because a failure of one dual-uplink tangent ring does not cause an entry of one or more other normal dual-uplink tangent rings to be cleared/updated, and further solves a problem of long-time service interruption because a problem of many entry updates does not occur even when there are a large number of users.

In a first aspect, the present invention provides a method for dual-uplink tangent ring convergence, where one or more downstream devices are dual-linked to a first network device and a second network device, links to the first network device and the second network device form one or more dual-uplink tangent rings, and the method includes receiving, by the first network device, an entry update packet from a first port of the first network device, or perceiving that a state of a first port of the first network device changes, and if it is determined that the first port of the first network device is a conjugate port, clearing all media access control (MAC) entries and Address Resolution Protocol (ARP) entries that use the first port of the first network device as an outbound interface and clearing all MAC entries that use a non-conjugate port of the first network device as an outbound interface, in a MAC table and an ARP table of the first network device, where a conjugate port is an access-side port of the first network device.

With reference to the first aspect, in a first possible implementation of the first aspect, if it is determined that the first port of the first network device is a conjugate port, after clearing entries that use the first port of the first network device as an outbound interface and are in the MAC table and the ARP table of the first network device, and clearing all entries that use a non-conjugate port of the first network device as an outbound interface and are in the MAC table of the first network device, the method further includes initiating, on the first port and all non-conjugate ports of the first network device, an ARP request for all ARP entries that use a non-conjugate port of the first network device as an outbound interface.

With reference to the first possible implementation of the first aspect, in a second possible implementation of the first aspect, the entry update packet includes virtual local area network (VLAN) information, and accordingly, the clearing all MAC entries and ARP entries that use the first port of the first network device as an outbound interface and clearing all MAC entries that use a non-conjugate port of the first network device as an outbound interface in the MAC table and the ARP table of the first network device further comprises clearing all MAC entries and ARP entries that use the first port of the first network device as an outbound interface and clearing all MAC entries that use a non-conjugate port of the first network device as an outbound interface, among MAC entries and ARP entries of all VLANs that are identified by the VLAN information, in the MAC table and the ARP table of the first network device, and the initiating, on the first port and all non-conjugate ports of the first network device, an ARP request for all ARP entries that use a non-conjugate port of the first network device as an outbound interface further comprises initiating, on the first port and all non-conjugate ports of the first network device, ARP requests for all ARP entries that use a non-conjugate port of the first network device as an outbound interface among ARP entries of all VLANs that are identified by the VLAN information.

With reference to any one of the first aspect and the first and the second possible implementations of the first aspect, in a third possible implementation of the first aspect, the entry update packet is an extended Flush packet of the SmartLink protocol, the extended Flush packet includes a first control virtual local area network identifier, and before determining that the first port of the first network device is a conjugate port, the method further includes acquiring, by the first network device, the first control virtual local area network identifier in the extended Flush packet, and determining that the first control virtual local area network identifier is the same as a control virtual local area network identifier configured for the first port of the first network device.

With reference to any one of the first aspect and the first to the third possible implementations of the first aspect, in a fourth possible implementation of the first aspect, the method further includes duplicating, by the first network device, the entry update packet, and forwarding it to a second port of the second network device.

With reference to any one of the first aspect and the first to the fourth possible implementations of the first aspect, in a fifth possible implementation of the first aspect, the method further includes discarding the entry update packet if it is determined that the first port of the first network device is a non-conjugate port.

In a second aspect, the present invention provides a network device, including a receiving module configured to receive an entry update packet from a first port of the network device, a determining module configured to determine whether the first port of the network device is a conjugate port, and an entry update module configured to when it is determined that the first port of the network device is a conjugate port, clear all MAC entries and ARP entries that use the first port of the network device as an outbound interface and clear all MAC entries that use a non-conjugate port of the network device as an outbound interface, in a MAC table and an ARP table of the network device, where a conjugate port is an access-side port of the first network device.

With reference to the second aspect, in a first possible implementation of the second aspect, the network device further includes an ARP request module configured to when it is determined that the first port of the network device is a conjugate port, initiate, on the first port and all non-conjugate ports of the network device, ARP requests for all ARP entries that use a non-conjugate port of the network device as an outbound interface.

With reference to the first possible implementation of the second aspect, in a second possible implementation of the second aspect, the entry update packet includes virtual local area network VLAN information, the entry update module is configured to when it is determined that the first port of the network device is a conjugate port, clear all MAC entries and ARP entries that use the first port of the network device as an outbound interface and clear all MAC entries that use a non-conjugate port of the network device as an outbound interface, among MAC entries and ARP entries of all VLANs that are identified by the VLAN information, in the MAC table and the ARP table of the network device, and the ARP request module is configured to when it is determined that the first port of the network device is a conjugate port, initiate, on the first port and all non-conjugate ports of the network device, ARP requests for all ARP entries that use a non-conjugate port as an outbound interface within all VLANs that are identified by the VLAN information.

With reference to any one of the second aspect and the first and the second possible implementations of the second aspect, in a third possible implementation of the second aspect, the entry update packet is an extended Flush packet of the SmartLink protocol, the extended Flush packet includes a first control virtual local area network identifier, and the network device further includes a second determining module configured to acquire the first control virtual local area network identifier in the entry update packet, and determine whether the first control virtual local area network identifier is the same as a control virtual local area network identifier configured for the first port, and accordingly, the first determining module is configured to when the second determining module determines that the first control virtual local area network identifier is the same as the control virtual local area network identifier configured for the first port, determine whether the first port of the network device is a conjugate port.

With reference to any one of the second aspect and the first to the third possible implementations of the second aspect, in a fourth possible implementation of the second aspect, the network device further includes a duplicating and forwarding module configured to duplicate the entry update packet and forward it to a second network device, and a discarding module configured to discard the entry update packet when it is determined that the first port of the network device is a non-conjugate port.

In a third aspect, the present invention provides a network device, including a state perceiving module configured to perceive a state change of a first port of the network device, a determining module configured to determine whether the first port of the network device is a conjugate port, and an entry update module configured to when it is determined that the first port of the network device is a conjugate port, clear all MAC entries and ARP entries that use the first port of the network device as an outbound interface and clear all MAC entries that use a non-conjugate port of the network device as an outbound interface, in a MAC table and an ARP table of the network device, where a conjugate port is an access-side port of the network device.

With reference to the third aspect, in a first possible implementation of the third aspect, network device further includes an ARP request module configured to when it is determined that the first port of the network device is a conjugate port, initiate, on the first port and all non-conjugate ports of the network device, ARP requests for all ARP entries that use a non-conjugate port of the network device as an outbound interface.

With reference to the third aspect or the first possible implementation of the third aspect, in a second possible implementation of the third aspect, the network device further includes a packet generating and sending module configured to generate a first entry update packet, and send the first entry update packet to a second network device.

With reference to the third aspect or any one of the first and the second possible implementations of the third aspect, in a third possible implementation of the third aspect, the network device further includes a receiving module configured to receive a second entry update packet from a second port of the network device, and accordingly, the determining module is further configured to determine whether the second port of the network device is a conjugate port.

In a fourth aspect, the present invention provides a dual-uplink tangent ring system, including a first upstream network device, a second upstream network device, and one or more downstream network devices, where the one or more downstream network devices are dual-linked to the first upstream network device and the second upstream network device, and links to the first upstream network device and the second upstream network device form one or more dual-uplink tangent rings, an access-side port that is among ports related to the one or more dual-uplink tangent rings and on the first upstream network device and the second upstream network device is a conjugate port, and the first upstream network device is configured to receive a first entry update packet from a first port of the first upstream network device or perceive that a state of a first port of the first upstream network device changes, determine whether the first port of the first upstream network device is a conjugate port, and when it is determined that the first port of the first upstream network device is a conjugate port, clear all MAC entries and ARP entries that use the first port of the first upstream network device as an outbound interface and clear all MAC entries that use a non-conjugate port of the first upstream network device as an outbound interface, in a MAC table and an ARP table of the first upstream network device, and initiate, on the first port and all non-conjugate ports of the first upstream network device, ARP requests for all ARP entries that use a non-conjugate port of the first upstream network device as an outbound interface, so as to update a related entry of a dual-uplink tangent ring on which the first port is located.

With reference to the fourth aspect, in a first possible implementation of the fourth aspect, the first upstream network device is further configured to, after receiving the first entry update packet from the first port of the first upstream network device, duplicate the first entry update packet and forward it to the second upstream network device, or when perceiving that the state of the first port of the first upstream network device changes, generate a second entry update packet and send it to the second upstream network device, and the second upstream network device is configured to receive the first entry update packet or the second entry update packet from a second port of the second upstream network device, and determine whether the second port of the second upstream network device is a conjugate port.

With reference to the fourth aspect or the first possible implementation of the fourth aspect, in a second possible implementation of the fourth aspect, the first downstream network device is configured to send the first entry update packet to the first port of the first upstream network device.

According to the technical solutions provided in the embodiments of the present invention, all ports that are related to multiple dual-uplink tangent rings and on a network device are classified into conjugate ports and non-conjugate ports, the network device receives an entry update packet from a first port or perceives a state change of the first port, the network device determines whether the first port is a conjugate port, and when it is determined that the first port is a conjugate port, clears all MAC entries and ARP entries that use the first port as an outbound interface and clears all MAC entries that use a non-conjugate port as an outbound interface, in a MAC table and an ARP table of the network device, retains MAC entries and ARP entries that use all other conjugate ports as outbound interfaces, and initiates, on the first port and all non-conjugate ports, an ARP request for all ARP entries that use a non-conjugate port as an outbound interface, so as to update a related entry of a dual-uplink tangent ring on which the first port is located. In this way, a problem of traffic interruption can be avoided because a failure of one dual-uplink tangent ring does not cause an entry of one or more other normal dual-uplink tangent rings to be cleared/updated. Furthermore, even when there are a large number of users, a problem of many entry updates does not occur, and long-time service interruption does not result.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

In the present invention, multiple ports that are related to a dual-uplink tangent ring and on network devices that form the dual-uplink tangent ring are classified into conjugate ports and non-conjugate ports, where the conjugate ports refer to access-side ports on the network devices that form the dual-uplink tangent ring, and the non-conjugate ports refer to ports between network devices that form a common tangent edge of the dual-uplink tangent ring, that is, ports on the common tangent edge of the dual-uplink tangent ring.

A network device may maintain a conjugate port set.

If N conjugate ports exist on the network device and N is a positive integer, it indicates that the network device can be reached via N dual-uplink tangent rings.

Figure 1A:
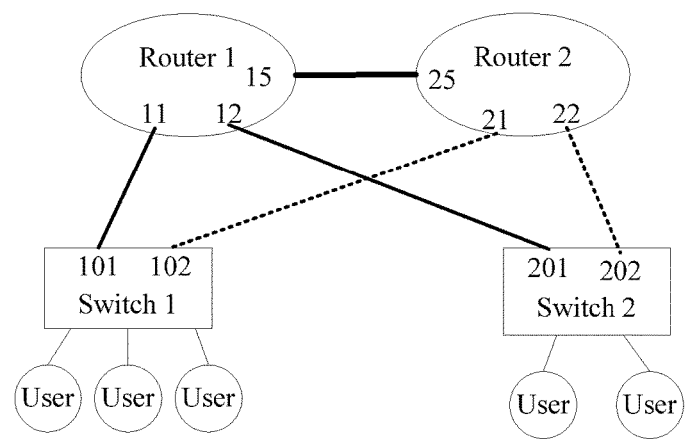
FIG. 1A and FIG. 1B are schematic diagrams of a network topology with multiple dual-uplink tangent rings.

Refer to FIG. 1A, which is a schematic diagram of a network topology with multiple dual-uplink tangent rings according to an embodiment of the present invention. As shown in FIG. 1A, two downstream network devices, namely, switch 1 and switch 2, are dual-linked to a pair of upstream network devices, namely, router 1 and router 2, and links to router 1 and router 2 form two dual-uplink tangent rings, where a link between router 1 and router 2 forms a common tangent edge of the two dual-uplink tangent rings, the pair of upstream network devices, namely, router 1 and router 2, serve as service gateways and are deployed in a PSPV manner, and the two dual-uplink tangent rings share one service VLAN and has a loop-breaking protocol deployed, such as SmartLink, RRPP, STP, RSTP, or MSTP, so as to prevent traffic from forming a loop in a broadcast domain.

As shown in FIG. 1A, ports 11, 12, and 15 on router 1 are ports on the multiple dual-uplink tangent rings, where ports 11 and 12 are access-side ports and conjugate ports, while port 15 is a port on the common tangent edge of the dual-uplink tangent rings and a non-conjugate port. Similarly, ports 21, 22, and 25 on router 2 are ports on the multiple dual-uplink tangent rings, where ports 21 and 22 are access-side ports and conjugate ports, while port 25 is a port on the common tangent edge of the dual-uplink tangent rings and a non-conjugate port.

Figure 1B:
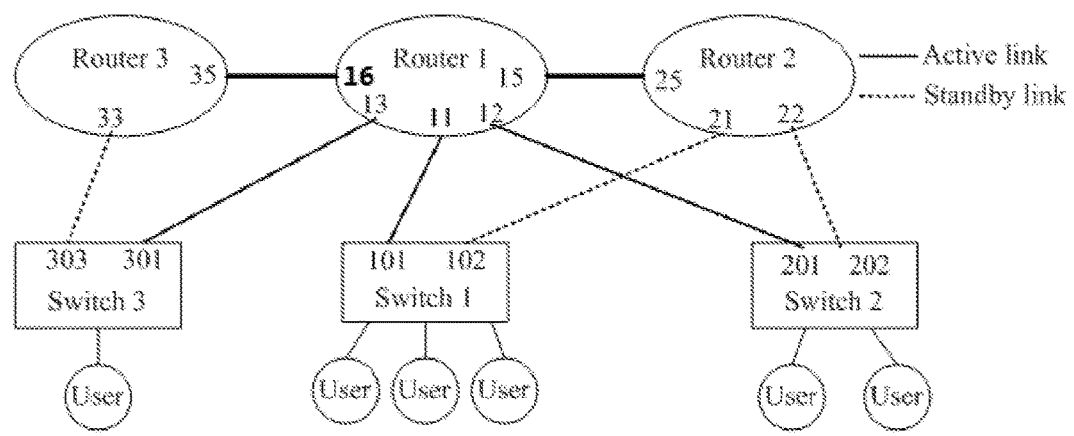

Refer to FIG. 1B, which is a schematic diagram of another type of a network topology with multiple dual-uplink tangent rings according to an embodiment of the present invention. As shown in FIG. 1B, there are three downstream network devices, namely, switch 1, switch 2, and switch 3, where switch 1 and switch 2 are dual-linked to a pair of upstream network devices, namely, router 1 and router 2, and links to router 1 and router 2 form two dual-uplink tangent rings, where a link between router 1 and router 2 forms a common tangent edge of the two dual-uplink tangent rings. Switch 3 is dual-linked to a pair of upstream network devices, namely, router 1 and router 3, and links to router 1 and router 3 form one dual-uplink tangent ring, where a link between router 1 and router 3 forms a common tangent edge of the dual-uplink tangent ring. Router 1, router 2, and router 3 serve as service gateways and are deployed in a PSPV manner, and the three dual-uplink tangent rings share one service VLAN and have a loop-breaking protocol deployed, so as to prevent traffic from forming a loop in a broadcast domain. As shown in FIG. 1B, ports 11, 12, 13, 15, and 16 on router 1 are ports on the multiple dual-uplink tangent rings, where ports 11, 12, and 13 are access-side ports and conjugate ports, while ports 15 and 16 are ports on the common tangent edges of the dual-uplink tangent rings and non-conjugate ports. Similarly, ports 21, 22, and 25 on router 2 are ports on the multiple dual-uplink tangent rings, where ports 21 and 22 are access-side ports and conjugate ports, while port 25 is a port on the common tangent edge of the dual-uplink tangent rings and a non-conjugate port. Similarly, ports 33 and 35 on router 3 are ports on the dual-uplink tangent ring, where port 33 is an access-side port and a conjugate port, while port 35 is a port on the common tangent edge of the dual-uplink tangent ring and a non-conjugate port.

Preferably, the technical solution in the present invention is used in a scenario in which multiple downstream network devices are dual-linked to a pair of upstream network devices, the pair of upstream network devices are deployed with a same service VLAN, and multiple dual-uplink tangent rings within the same service VLAN is formed. A person skilled in the art should understand that the technical solution in the present invention is also applicable when only one downstream network device is dual-linked to a pair of upstream network devices, that is, when there is only one dual-uplink tangent ring.

A person skilled in the art should understand that a conjugate port and a non-conjugate port are merely intended to distinguish an access-side port from a non-access-side port, and other naming conventions may also be used, which is not limited in the present invention.

Figure 2:
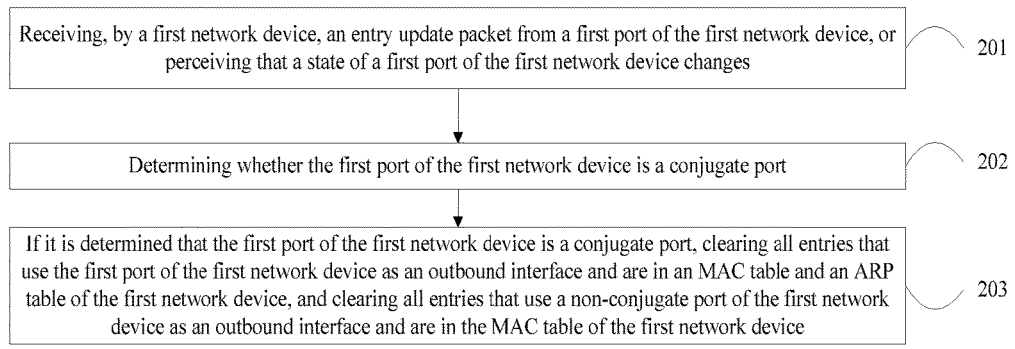
FIG. 2 is a flowchart of a method for dual-uplink tangent ring convergence according to an embodiment of the present invention.

An embodiment of the present invention provides a method for dual-uplink tangent ring convergence. As shown in FIG. 2, the method includes the following steps:

201. A first network device receives an entry update packet from a first port of the first network device or perceives that a state of a first port of the first network device changes.

The entry update packet may be an extended Flush packet or an extended topology change (TC) packet. Specifically, if a deployed loop-breaking protocol is the SmartLink or RRPP protocol, the entry update packet is an extended Flush packet, for example, a control type or control version field of a Flush packet in the SmartLink protocol may be extended to obtain an extended Flush packet, and this is not limited in the present invention, if the deployed loop-breaking protocol is RSTP, MSTP, or the like, the entry update packet is an extended TC packet, for example, a protocol version identifier field of a TC packet may be extended, for example, using an identifier value that is not used in an existing protocol, to obtain an extended TC packet, and this is not limited in the present invention. The entry update packet may also be customized according to a corresponding loop-breaking protocol.

The perceiving, by a first network device, that a state of a first port of the first network device changes is perceiving, by the first network device, that the state of the first port of the first network device changes from a blocked state to a forwarding state. In this field, a state of a port is generally indicated by blocked or forwarding and may also be indicated by down or up sometimes.

202. The first network device determines whether the first port of the first network device is a conjugate port.

203. If it is determined that the first port of the first network device is a conjugate port, the first network device clears all MAC entries and ARP entries that use the first port of the first network device as an outbound interface and clears all MAC entries that use a non-conjugate port of the first network device as an outbound interface, in a MAC table and an ARP table of the first network device. Further, on the first port and all non-conjugate ports of the first network device, an ARP request is initiated for all ARP entries that use a non-conjugate port of the first network device as an outbound interface, so as to update a related entry of a dual-uplink tangent ring on which the first port is located. Proactive initiation of the ARP request can accelerate an update of the related entry and therefore allow rapid service recovery.

In this way, the first network device clears/updates only an entry that is related to the dual-uplink tangent ring on which the first port is located and in the MAC table and the ARP table of the first network device, and retains entries that use all other conjugate ports as outbound interfaces in the MAC table and the ARP table of the first network device, that is, retains entries related to one or more other dual-uplink tangent rings, so that a failure of one dual-uplink tangent ring does not cause an entry of one or more other dual-uplink tangent rings to be cleared/updated.

If it is determined that the first port of the first network device is a non-conjugate port, the first network device does not process the entry update packet or does not process the state change of the first port, that the first network device does not process the entry update packet may be discarding the entry update packet.

Optionally, the first network device duplicates the entry update packet and forwards it to a second network device. Further, the first network device duplicates the entry update packet, and forwards the duplicated entry update packet to the second network device from a second port of the first network device and through a link connecting the first network device and the second network device, that is, through a common tangent edge of a dual-uplink tangent ring. Accordingly, the second network device receives, from a second port of the second network device, the entry update packet that is duplicated and forwarded by the first network device. Because the second port of the second network device is a port on a common tangent edge of a dual-uplink tangent ring and is a non-conjugate port, the second network device discards the entry update packet.

According to the method for dual-uplink tangent ring convergence provided in this embodiment, all ports that are related to multiple dual-uplink tangent rings and on a first network device are classified into conjugate ports and non-conjugate ports, the first network device receives an entry update packet from a first port or perceives a state change of the first port, the first network device determines whether the first port is a conjugate port, and when it is determined that the first port is a conjugate port, clears all MAC entries and ARP entries that use the first port as an outbound interface and clears all MAC entries that use a non-conjugate port as an outbound interface, in a MAC table and an ARP table of the first network device, retains MAC entries and ARP entries that use all other conjugate ports as outbound interfaces, and initiates, on the first port and all non-conjugate ports, an ARP request for all ARP entries that use a non-conjugate port as an outbound interface, so as to update a related entry of a dual-uplink tangent ring on which the first port is located. In this way, a problem of traffic interruption can be avoided because a failure of one dual-uplink tangent ring does not cause an entry of one or more other normal dual-uplink tangent rings to be cleared/updated. Furthermore, even when there are a large number of users, a problem of many entry updates does not occur, and long-time service interruption does not result.

Figure 3:
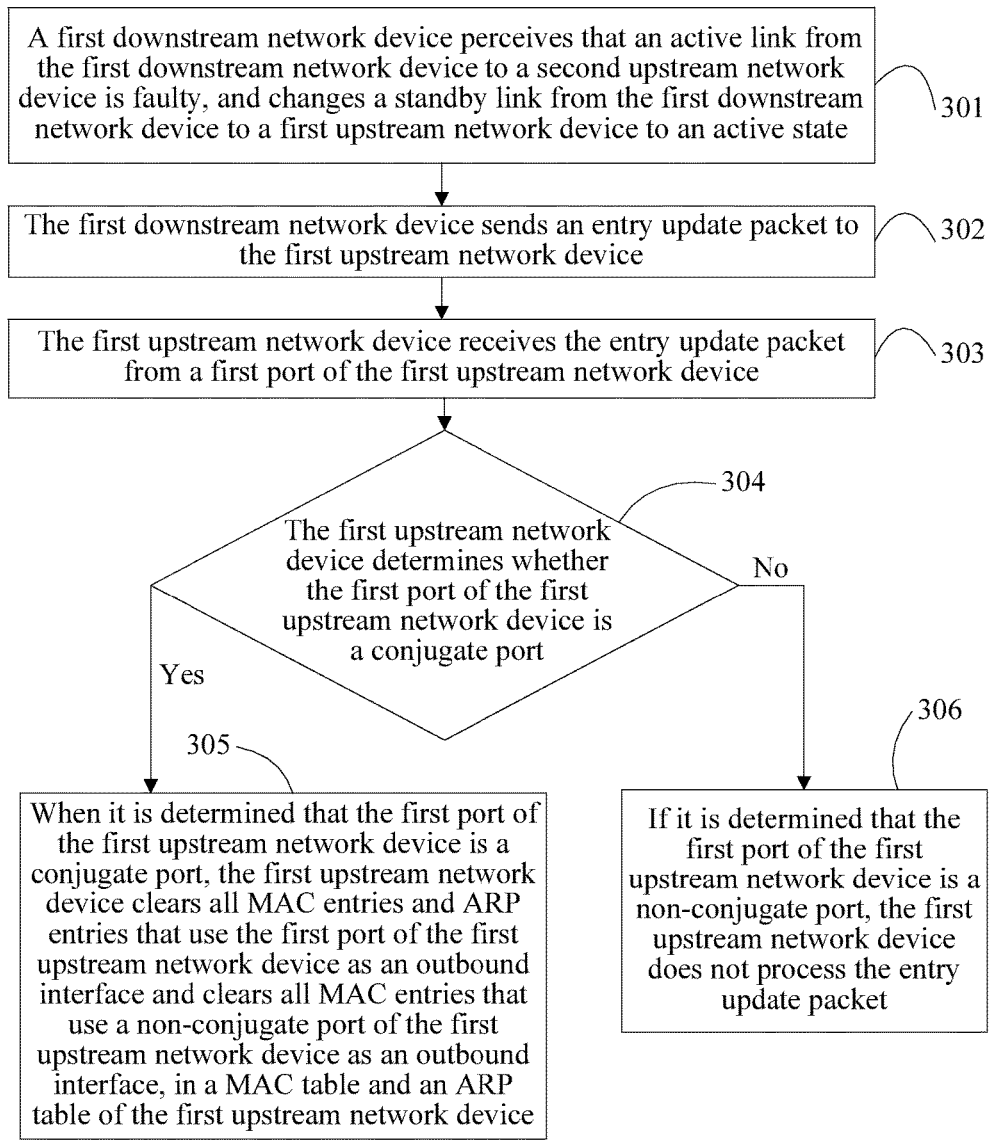
FIG. 3 is a flowchart of another method for dual-uplink tangent ring convergence according to an embodiment of the present invention.

An embodiment of the present invention provides a method for dual-uplink tangent ring convergence. As shown in FIG. 3, the method includes the following steps:

301. A first downstream network device perceives, using a loop-breaking protocol, that an active link from the first downstream network device to a second upstream network device is faulty, and changes a standby link from the first downstream network device to a first upstream network device to an active state.

Ports at two ends of the standby link from the first downstream network device to the first upstream network device are a standby uplink port of the first downstream network device and a first port of the first upstream network device. The changing a standby link from the first downstream network device to a first upstream network device to an active state includes changing, by the first downstream network device, a state of the standby uplink port of the first downstream network device from a blocked state to a forwarding state, and similarly, a state of the first port of the first upstream network device changes from the blocked state to the forwarding state.

Further, with reference to a scenario in which an active link from switch 1 to router 1 in FIG. 1A or 1B is faulty, switch 1 perceives, using a loop-breaking protocol, for example, the SmartLink protocol, that the active link from switch 1 to router 1 is faulty, and changes a standby link from switch 1 to router 2 to the active state, that is, changes a state of port 102 on switch 1 from the blocked state to the forwarding state, and similarly, a state of port 21 on router 2 changes from the blocked state to the forwarding state.

302. The first downstream network device sends an entry update packet to the first upstream network device.

Further, after the state of the standby uplink port of the first downstream network device changes from the blocked state to the forwarding state, the first downstream network device sends an entry update packet from the standby uplink port of the first downstream network device to the first port of the first upstream network device.

The entry update packet is an extended Flush packet or an extended TC packet. For details, refer to step 201, and details are not described herein again.

With reference to FIG. 1A or 1B, after the state of port 102 on switch 1 changes from the blocked state to the forwarding state, switch 1 sends an entry update packet, that is, an extended Flush packet, to router 2, wherein switch 1 sends the extended Flush packet from port 102 on switch 1 to port 21 on router 2.

303. The first upstream network device receives the entry update packet from the first port of the first upstream network device.

With reference to FIG. 1A or 1B, router 2 receives the extended Flush packet from port 21.

304. The first upstream network device determines whether the first port of the first upstream network device is a conjugate port.

Further, the first upstream network device queries whether the first port exists in a conjugate port set of the first upstream network device, and determines, according to a query result, whether the first port of the first upstream network device is a conjugate port, if the first port of the first upstream network device is found in the conjugate port set of the first upstream network device, determines that the first port of the first upstream network device is a conjugate port, and if the first port of the first upstream network device is not found in the conjugate port set of the first upstream network device, determines that the first port of the first upstream network device is a non-conjugate port.

If it is determined that the first port of the first upstream network device is a conjugate port, step 305 is performed, and if it is determined that the first port of the first upstream network device is a non-conjugate port, step 306 is performed.

With reference to FIG. 1A or 1B, router 2 determines whether port 21 is a conjugate port, if port 21 is a conjugate port, step 305 is performed, that is, all entries that are related to a dual-uplink tangent ring of switch 1 and on router 2 are updated.

Optionally, if a deployed loop-breaking protocol is the SmartLink protocol, the entry update packet includes a first control virtual local area network identifier. Accordingly, before step 304, the method further includes the following step 304a. The first upstream network device acquires the first control virtual local area network identifier in the entry update packet, and determines whether the first control virtual local area network identifier is the same as a control virtual local area network identifier configured for the first port of the first upstream network device, if the first control virtual local area network identifier is the same as the control virtual local area network identifier configured for the first port, step 301 is performed, and if the two control virtual local area network identifiers are different, the entry update packet is not processed, the entry update packet may be directly forwarded according to the SmartLink protocol, and the processing procedure of this method ends.

305. When it is determined that the first port of the first upstream network device is a conjugate port, the first upstream network device clears all MAC entries and ARP entries that use the first port of the first upstream network device as an outbound interface and clears all MAC entries that use a non-conjugate port of the first upstream network device as an outbound interface, in a MAC table and an ARP table of the first upstream network device, and further initiates, on the first port and all non-conjugate ports of the first upstream network device, an ARP request for all ARP entries that use a non-conjugate port as an outbound interface, so as to update a related entry of a dual-uplink tangent ring on which the first port is located. Proactive initiation of the ARP request can accelerate an update of the related entry and thereby allow rapid service recovery.

In this way, only an entry that is related to the dual-uplink tangent ring on which the first port is located and in the MAC table and the ARP table of the first upstream network device is cleared/updated, and entries that use all other conjugate ports as outbound interfaces in the MAC table and the ARP table of the first upstream network device are retained, that is, entries related to one or more other dual-uplink tangent rings are retained, so that a failure of one dual-uplink tangent ring does not cause an entry of one or more other dual-uplink tangent rings to be cleared/updated.

With reference to FIG. 1A or 1B, when router 2 determines that port 21 is a conjugate port, router 2 clears a MAC entry and an ARP entry that use port 21 as an outbound interface and clears all MAC entries that use a non-conjugate port, namely, port 25, as an outbound interface, in a MAC table and an ARP table of router 2, and further initiates, on port 21 and port 25, an ARP request for all ARP entries that use port 25 as an outbound interface, so as to update a related entry of a dual-uplink tangent ring on which switch 1 is located. In this way, only the related entry of the dual-uplink tangent ring of switch 1 is cleared/updated, and related entries of dual-uplink tangent rings of switch 2 and switch 3 are not cleared/updated, thereby preventing a failure of the dual-uplink tangent ring of switch 1 from affecting the dual-uplink tangent rings of switch 2 and switch 3.

Optionally, the entry update packet further includes VLAN information, which may be one or more VLAN identifiers. For example, a VLAN bitmap field of an extended Flush packet defined in the SmartLink protocol is used to carry one or more service VLAN identifiers that need to be updated.

If the entry update packet includes the VLAN information, when it is determined that the first port of the first upstream network device is a conjugate port, a clear/update operation is performed on an entry that is related to the dual-uplink tangent ring on which the first port of the first upstream network device is located, within all VLANs that are identified by the VLAN information in the entry update packet.

Further, if the entry update packet includes the VLAN information, the when it is determined that the first port of the first upstream network device is a conjugate port, clearing, by the first upstream network device, all MAC entries and ARP entries that use the first port of the first upstream network device as an outbound interface and clearing all MAC entries that use a non-conjugate port of the first upstream network device as an outbound interface, in a MAC table and an ARP table of the first upstream network device further comprises clearing all MAC entries and ARP entries that use the first port of the first upstream network device as an outbound interface and clearing all MAC entries that use a non-conjugate port of the first upstream network device as an outbound interface, among MAC entries and ARP entries of all VLANs that are identified by the VLAN information in the entry update packet, in the MAC table and the ARP table of the first upstream network device, and the initiating, on the first port and all non-conjugate ports of the first upstream network device, an ARP request for all ARP entries that use a non-conjugate port as an outbound interface further comprises initiating, on the first port and all non-conjugate ports of the first upstream network device, an ARP request for all ARP entries that use a non-conjugate port as an outbound interface within all VLANs that are identified by the VLAN information in the entry update packet.

Further, optionally, the first upstream network device may further duplicate the entry update packet and forward it to the second upstream network device. Further, the first upstream network device duplicates the entry update packet, and forwards the duplicated entry update packet to the second network device from a second port of the first upstream network device and through a link connecting the first upstream network device and the second upstream network device, that is, through a common tangent edge of a dual-uplink tangent ring.

Accordingly, the second upstream network device receives, from a second port of the second upstream network device, the entry update packet that is duplicated and forwarded by the first upstream network device. Because the second port of the second upstream network device is a port on a common tangent edge of a dual-uplink tangent ring and is a non-conjugate port, the second upstream network device discards the entry update packet.

With reference to FIG. 1A or 1B, router 2 forwards the entry update packet to port 15 on router 1 from port 25 and through a link between router 2 and router 1, after receiving the entry update packet from port 15, router 1 determines that port 15 is a non-conjugate port, and router 1 does not process the entry update packet and discards the entry update packet.

306. If it is determined that the first port of the first upstream network device is a non-conjugate port, the first upstream network device does not process the entry update packet, further, the first upstream network device may discard the entry update packet, and the processing procedure of this method ends.

Further, optionally, after the first upstream network device perceives, using the loop-breaking protocol, that the active link from the first downstream network device to the second upstream network device is recovered, the first downstream network device changes a state of a port of the standby link from the first downstream network device to the first upstream network device, that is, the standby uplink port of the first downstream network device, from the forwarding state to the blocked state, and accordingly, the state of the first port of the first upstream network device changes from the forwarding state to the blocked state, and the first downstream network device sends a new entry update packet to the second upstream network device. The second upstream network device receives and processes the new entry update packet according to a processing procedure and principle that are similar to steps 303-306, and therefore details are not described herein again.

According to the method for dual-uplink tangent ring convergence provided in this embodiment, all ports that are related to multiple dual-uplink tangent rings and on an upstream network device are classified into conjugate ports and non-conjugate ports. When receiving an entry update packet from a first port, the upstream network device determines whether the first port is a conjugate port, and when it is determined that the first port is a conjugate port, clears all MAC entries and ARP entries that use the first port as an outbound interface and clears all MAC entries that use a non-conjugate port as an outbound interface, in a MAC table and an ARP table of the upstream network device, retains MAC entries and ARP entries that use all other conjugate ports as outbound interfaces, and initiates, on the first port and all non-conjugate ports, an ARP request for all ARP entries that use a non-conjugate ports as an outbound interface, so as to update a related entry of a dual-uplink tangent ring on which the first port is located, and the entry update packet is discarded without processing if it is determined that the first port is a non-conjugate port. In this way, clearing/updating on a related entry due to a change in a dual-uplink tangent topology structure does not cause an entry of one or more other dual-uplink tangent rings to be cleared/updated, thereby avoiding a problem of traffic interruption because a failure of one dual-uplink tangent ring does not cause an entry of one or more other normal dual-uplink tangent rings to be cleared/updated and further solving a problem of long-time service interruption because a problem of many entry updates does not occur even when there are a large number of users.

Figure 4:
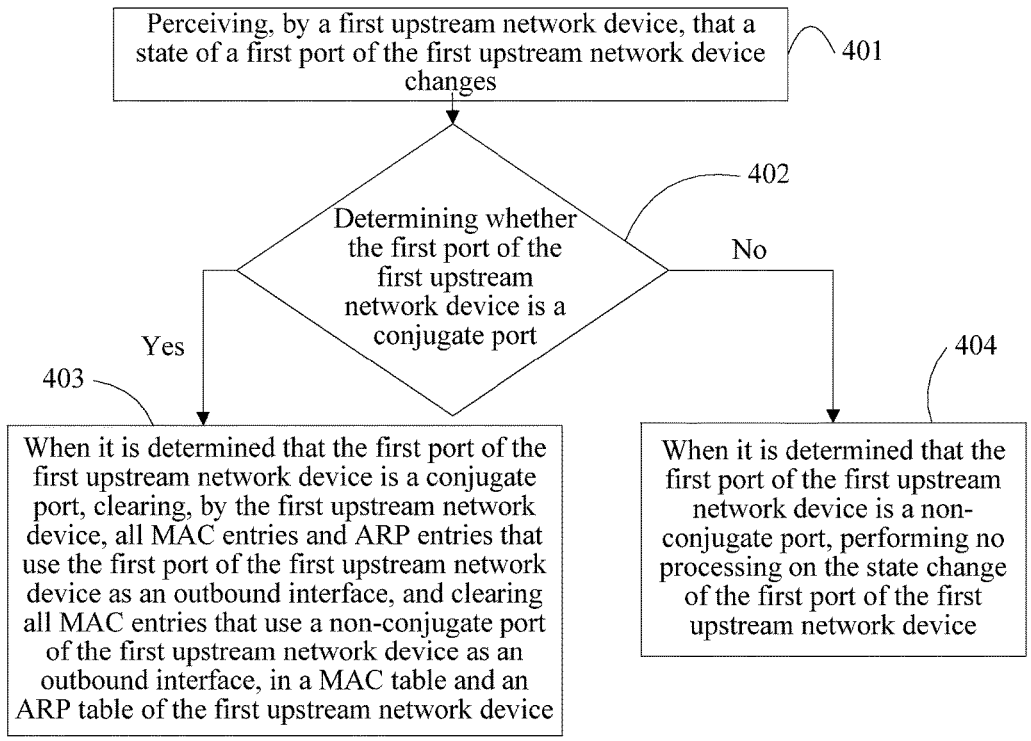
FIG. 4 is a flowchart of still another method for dual-uplink tangent ring convergence according to an embodiment of the present invention.

An embodiment of the present invention provides a method for dual-uplink tangent ring convergence. As shown in FIG. 4, the method includes the following steps:

401. A first upstream network device perceives that a state of a first port of the first upstream network device changes.

A first downstream network device is dual-linked to the first upstream network device and a second upstream network device, and the first downstream network device connects to the first port of the first upstream network device and a first port of the second upstream network device. A loop-breaking protocol, such as MSTP or RSTP, runs on the first upstream network device and the second upstream network device. After an active link from the first downstream network device to the second upstream network device is faulty, a standby link from the downstream network device to the first upstream network device is changed to an active state, that is, the state of the first port of the first upstream network device changes to a forwarding state. This is generally completed by a loop-breaking protocol, such as MSTP or RSTP, and further details are not described in the present invention.

Then, the first upstream network device perceives that the state of the first port of the first upstream network device changes, and changes from a blocked state to the forwarding state.

Further, with reference to the scenario of RSTP/MSTP protocol deployment in FIG. 1A, an initial configuration is as follows. Router 1 is a root node, and ports 11, 12, and 15 on router 1 are specified ports and in the forwarding state, ports 21 and 22 on router 2 are standby (alternate) ports and in the blocked state, and port 25 is a root port and in the forwarding state, port 101 on switch 1 is a root port and in the forwarding state, and port 102 is a specified port and in the blocked state, port 201 on switch 2 is a root port and in the forwarding state, and port 202 is a specified port and in the blocked state. With reference to the scenario of RSTP/MSTP protocol deployment in FIG. 1B, except the initial configuration as FIG. 1A described above, furthermore, ports 13 and 16 on router 1 are specified ports and in the forwarding state, port 33 on router 3 is standby (alternate) port and in the blocked state, port 35 on router 3 is a root port and in the forwarding state, port 301 on switch 3 is a root port and in the forwarding state, and port 303 on switch 3 is a specified port and in the blocked state.

When an active link from switch 1 to router 1 is faulty, a state of port 21 on router 2 changes from the blocked state to the forwarding state, a standby link from switch 1 to router 2 is changed to an active state, and router 2 perceives that the state of port 21 changes.

402. The first upstream network device determines whether the first port of the first upstream network device is a conjugate port.

Further, the first upstream network device may query whether the first port of the first upstream network device exists in a conjugate port set of the first upstream network device, and determines, according to a query result, whether the first port of the first upstream network device is a conjugate port, if the first port of the first upstream network device is found in the conjugate port set of the first upstream network device, determines that the first port of the first upstream network device is a conjugate port, and if the first port of the first upstream network device is not found in the conjugate port set of the first upstream network device, determines that the first port of the first upstream network device is a non-conjugate port.

If it is determined that the first port of the first upstream network device is a conjugate port, step 403 is performed, and if it is determined that the first port of the first upstream network device is a non-conjugate port, step 404 is performed.

With reference to the FIG. 1A scenario in step 401, router 2 determines whether port 21 is a conjugate port, if it is determined that port 21 is a conjugate port, step 403 is performed, that is, all entries that are related to a dual-uplink tangent ring of switch 1 and on router 2 are updated.

403. When it is determined that the first port of the first upstream network device is a conjugate port, the first upstream network device clears all MAC entries and ARP entries that use the first port of the first upstream network device as an outbound interface and clears all MAC entries that use a non-conjugate port of the first upstream network device as an outbound interface, in a MAC table and an ARP table of the first upstream network device, and further initiates, on the first port and all non-conjugate ports of the first upstream network device, an ARP request for all ARP entries that use a non-conjugate port as an outbound interface, so as to update a related entry of a dual-uplink tangent ring on which the first port is located, where proactive initiation of the ARP request can accelerate an update of the related entry and thereby allow rapid service recovery.

In this way, only an entry that is related to the dual-uplink tangent ring on which the first port is located and in the MAC table and the ARP table of the first network device is cleared/updated, and entries that use all other conjugate ports as outbound interfaces in the MAC table and the ARP table of the first upstream network device are retained, that is, entries related to one or more other dual-uplink tangent rings are retained, so that a failure of one dual-uplink tangent ring does not cause an entry of one or more other dual-uplink tangent rings to be cleared/updated.

With reference to the FIG. 1A scenario in step 401, when router 2 determines that port 21 is a conjugate port, router 2 clears a MAC entry and an ARP entry that use port 21 as an outbound interface and clears all MAC entries that use a non-conjugate port, namely, port 25, as an outbound interface, in a MAC table and an ARP table of router 2, and further initiates, on port 21 and port 25, an ARP request for all ARP entries that use port 25 as an outbound interface, so as to update a related entry of a dual-uplink tangent ring on which switch 1 is located. In this way, switch 2 does not clear all entries and clears/updates only the related entry of the dual-uplink tangent ring of switch 1, thereby avoiding a failure of the dual-uplink tangent ring of switch 1 from affecting a dual-uplink tangent ring of switch 2.

404. When it is determined that the first port of the first upstream network device is a non-conjugate port, the first upstream network device does not process the state change of the first port of the first upstream network device.

Optionally, after the first upstream network device perceives the state change of the first port of the first upstream network device, the first upstream network device may generate an entry update packet, such as an extended TC packet, and send it to the second upstream network device. Further, the first upstream network device generates the entry update packet, and sends the generated entry update packet to the second upstream network device from a second port of the first upstream network device and through a link connecting the first upstream network device and the second upstream network device, that is, through a common tangent edge of a dual-uplink tangent ring. Accordingly, the second upstream network device receives, from a second port of the second upstream network device, the entry update packet that is generated and sent by the first upstream network device. Because the second port of the second upstream network device is a port on a common tangent edge of a dual-uplink tangent ring and is a non-conjugate port, the second upstream network device discards the entry update packet. Optionally, the first upstream network device may further send the entry update packet to the first downstream network device from the first port of the first upstream network device, so that the first downstream network device clears/updates a related entry.

With reference to the FIG. 1A scenario in step 401, router 2 generates an extended TC packet and sends it to port 15 on router 1 from port 25 and through a link between router 2 and router 1. After receiving the extended TC packet from port 15, router 1 determines that port 15 is a non-conjugate port, and router 1 does not process the extended TC packet and discards the extended TC packet. Meanwhile, router 2 may further send the extended TC packet to switch 1 from port 21, so that switch 1 clears a MAC entry.

Further, optionally, after the active link from the first downstream network device to the second upstream network device is recovered, a state of the first port of the second upstream network device changes to the forwarding state, and the state of the first port of the first upstream network device changes to the blocked state. This is generally completed by a loop-breaking protocol, such as MSTP or RSTP, and further details are not described in the present invention. Then, the second upstream network device perceives that the state of the first port of the second upstream network device changes, that is, changes from the blocked state to the forwarding state, and the second upstream network device determines whether the first port of the second upstream network device is a conjugate port. If the second upstream network device determines that the first port of the second upstream network device is a conjugate port, the second upstream network device clears/updates a related entry of a dual-uplink tangent ring on which the first port of the second upstream network device is located according to a processing procedure and principle that are similar to step 403, and details are not described herein again. Optionally, the second upstream network device may generate an entry update packet, such as an extended TC packet, and send it to the first upstream network device. The second upstream network device generates the entry update packet and sends the entry update packet to the first upstream network device from the second port of the second upstream network device. Accordingly, the first upstream network device receives the entry update packet from the second port of the first upstream network device, and because the second port of the first upstream network device is a port on a common tangent edge of a dual-uplink tangent ring and is a non-conjugate port, the first upstream network device does not process the entry update packet and discards the entry update packet. Optionally, the second upstream network device sends the entry update packet to the first downstream network device from the first port of the second upstream network device, so that the first downstream network device clears/updates a related entry. The second upstream network device sends the entry update packet only to the first port, whose state changes to the forwarding state, instead of sending the entry update packet to all specified ports of the second upstream network device, which is different from the prior art.

With reference to the FIG. 1A scenario in step 401, the active link from switch 1 to router 1 recovers, the state of the alternate port, namely, port 21, on router 2 changes back to the state of being blocked, port 11 on router 1 is restored to the forwarding state, router 1 perceives the state change of port 11, determines whether port 11 is a conjugate port, and when it is determined that port 11 is a conjugate port, clears a MAC entry and an ARP entry that use port 11 as an outbound interface and clears all MAC entries that use a non-conjugate port, namely, port 15, as an outbound interface, from a MAC table and an ARP table of router 1, and further initiates, on port 11 and port 15, an ARP request for all ARP entries that use port 15 as an outbound interface. Further, router 1 may generate an extended TC packet and send it to port 25 on router 2 from port 15 and through a link between router 2 and router 1. After receiving the extended TC packet from port 25, router 2 determines that port 25 is a non-conjugate port, and router 2 does not process the extended TC packet and discards the extended TC packet. Meanwhile, router 1 may further send the extended TC packet to switch 1 from port 11, so that switch 1 clears a MAC entry.

According to the method for dual-uplink tangent ring convergence provided in this embodiment, all ports that are related to multiple dual-uplink tangent rings and on an upstream network device are classified into conjugate ports and non-conjugate ports. When perceiving that a state of a first port changes, the upstream network device determines whether the first port is a conjugate port, and when it is determined that the first port is a conjugate port, clears all MAC entries and ARP entries that use the first port as an outbound interface and clears all MAC entries that use a non-conjugate port as an outbound interface, in a MAC table and an ARP table of the network device, retains MAC entries and ARP entries that use all other conjugate ports as outbound interfaces, and initiates, on the first port and all non-conjugate ports, an ARP request for all ARP entries that use a non-conjugate port as an outbound interface, so as to update a related entry of a dual-uplink tangent ring on which the first port is located, and the entry update packet is discarded without processing if it is determined that the first port is a non-conjugate port. In this way, clearing/updating on a related entry due to a change in a dual-uplink tangent topology structure does not cause an entry of one or more other dual-uplink tangent rings to be cleared/updated, thereby avoiding a problem of traffic interruption because a failure of one dual-uplink tangent ring does not cause an entry of one or more other normal dual-uplink tangent rings to be cleared/updated and further solving a problem of long-time service interruption because a problem of many entry updates does not occur even when there are a large number of users.

Figure 5:
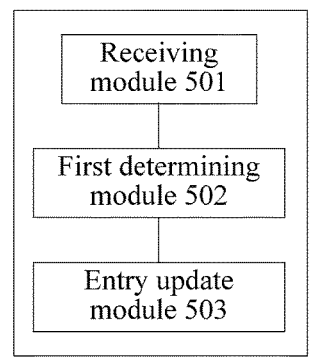
FIG. 5 and FIG. 6 are schematic structural diagrams of a network device according to an embodiment of the present invention.

An embodiment of the present invention provides a network device. As shown in FIG. 5, the network device includes a receiving module 501 configured to receive an entry update packet from a first port of the network device, a first determining module 502 configured to determine whether the first port of the network device is a conjugate port, and an entry update module 503 configured to when it is determined that the first port of the network device is a conjugate port, clear all MAC entries and ARP entries that use the first port of the network device as an outbound interface and clear all MAC entries that use a non-conjugate port of the network device as an outbound interface, in a MAC table and an ARP table of the network device.

Figure 6:
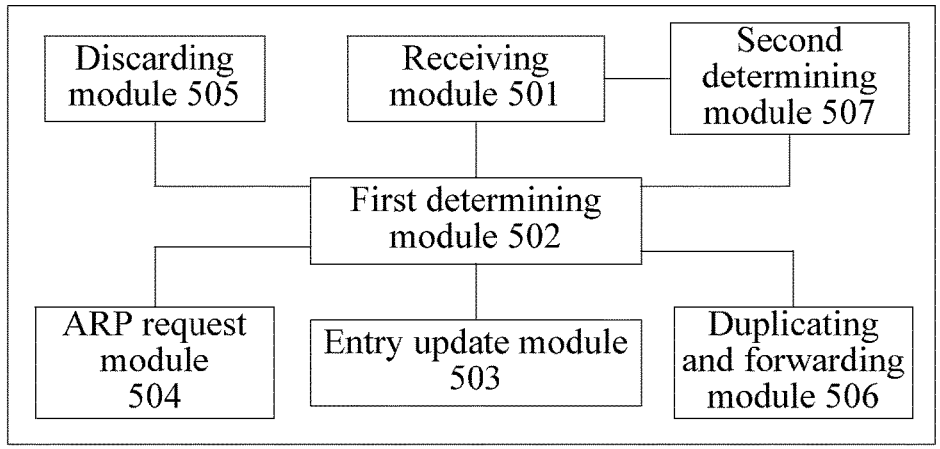

As shown in FIG. 6, the network device may further include an ARP request module 504 configured to when it is determined that the first port of the network device is a conjugate port, initiate, on the first port and all non-conjugate ports of the network device, an ARP request for all ARP entries that use a non-conjugate port of the network device as an outbound interface.

Optionally, as shown in FIG. 6, the network device further includes a discarding module 505 and a duplicating and forwarding module 506.

The discarding module 505 is configured to discard the entry update packet when it is determined that the first port of the network device is a non-conjugate port. In this way, the network device does not process the entry update packet if the first port is a non-conjugate port.

The duplicating and forwarding module 506 is configured to duplicate the entry update packet and forward it to a second network device, where the duplicating and forwarding module 506 is configured to duplicate the entry update packet and forward the duplicated entry update packet to the second network device from a second port of the network device and through a link connecting the network device and the second network device, that is, through a common tangent edge of a dual-uplink tangent ring. Accordingly, the second network device receives, from a second port of the second network device, the entry update packet that is duplicated and forwarded by the network device. Because the second port of the second network device is a port on the common tangent edge of the dual-uplink tangent ring and is a non-conjugate port, the second network device discards the entry update packet.

Further, optionally, if a deployed loop-breaking protocol is the SmartLink protocol, and the entry update packet includes a first control virtual local area network identifier. Accordingly, as shown in FIG. 6, the network device further includes a second determining module 507 configured to acquire the first control virtual local area network identifier in the entry update packet, and determine whether the first control virtual local area network identifier is the same as a control virtual local area network identifier configured for the first port. Accordingly, the first determining module 502 is configured to when the second determining module 507 determines that the first control virtual local area network identifier is the same as the control virtual local area network identifier configured for the first port, determine whether the first port of the network device is a conjugate port, and the discarding module 505 is further configured to discard the entry update packet when the second determining module 507 determines that the first control virtual local area network identifier is different from the control virtual local area network identifier configured for the first port.

Further, optionally, the entry update packet further includes VLAN information, which may be one or more VLAN identifiers. For example, a VLAN bitmap field of an extended Flush packet defined in the SmartLink protocol is used to carry one or more service VLAN identifiers that need to be updated. Accordingly, the entry update module 503 is configured to when it is determined that the first port of the network device is a conjugate port, clear all MAC entries and ARP entries that use the first port of the network device as an outbound interface and clear all MAC entries that use a non-conjugate port of the network device as an outbound interface, among MAC entries and ARP entries of all VLANs that are identified by the VLAN information in the entry update packet, in the MAC table and the ARP table of the network device, and the ARP request module 504 is configured to when it is determined that the first port of the network device is a conjugate port, initiate, on the first port and all non-conjugate ports of the network device, an ARP request for all ARP entries that use a non-conjugate port as an outbound interface within all VLANs that are identified by the VLAN information in the entry update packet.

According to the network device provided in this embodiment, all ports that are related to multiple dual-uplink tangent rings and on the network device are classified into conjugate ports and non-conjugate ports. When receiving an entry update packet from a first port, the network device determines whether the first port is a conjugate port, and when it is determined that the first port is a conjugate port, clears all MAC entries and ARP entries that use the first port as an outbound interface and clears all MAC entries that use a non-conjugate port as an outbound interface, in a MAC table and an ARP table of the network device, retains MAC entries and ARP entries that use all other conjugate ports as outbound interfaces, and initiates, on the first port and all non-conjugate ports, an ARP request for all ARP entries that use a non-conjugate port as an outbound interface, so as to update a related entry of a dual-uplink tangent ring on which the first port is located, and the entry update packet is discarded without processing if it is determined that the first port is a non-conjugate port. In this way, a problem of traffic interruption can be avoided because a failure of one dual-uplink tangent ring does not cause an entry of one or more other normal dual-uplink tangent rings to be cleared/updated, and a problem of long-time service interruption can further be solved because a problem of many entry updates does not occur even when there are a large number of users.

Figure 7:
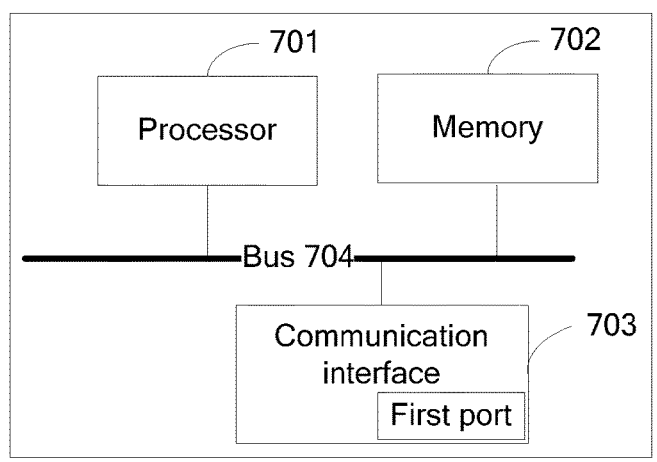
FIG. 7 is a schematic diagram of a hardware structure of a network device according to an embodiment of the present invention.

An embodiment of the present invention further provides a network device. As shown in FIG. 7, the network device includes a processor 701, a memory 702, a communication interface 703, and a bus 704. The processor 701, the memory 702, and the communication interface 703 connect to each other through the bus 704, and the bus 704 may be an address bus, a data bus, a control bus, or the like. For ease of illustration, only one bold line is illustrated in FIG. 7 but this does not mean that there is only one bus or one type of bus.

The memory 702 is configured to store a program. Further, the program may include program code, and the program code includes a computer operation instruction.

The communication interface 703 is configured to connect to one or more other devices and communicate with the one or more other devices, and the communication interface 703 includes at least a first port.

The processor includes a central processing unit (CPU), a network processor (NP), a digital signal processor (DSP), an application specific integrated circuit (ASIC), a field-programmable gate array (FPGA), a microprocessor, or the like. The memory includes a high-speed random access memory (RAM) or a non-volatile memory (NVM), for example, an electrically erasable and programmable read only memory (EEPROM) and a flash memory (Flash).

The processor 701 executes the program stored in the memory 702, so as to receive an entry update packet from the first port, determines whether the first port is a conjugate port, and when it is determined that the first port is a conjugate port, clears all MAC entries and ARP entries that use the first port as an outbound interface and clears all MAC entries that use a non-conjugate port of the network device as an outbound interface, in a MAC table and an ARP table of the network device.

The processor 701 is further configured to when it is determined that the first port is a conjugate port, initiate, on the first port and all non-conjugate ports, an ARP request for all ARP entries that use a non-conjugate port as an outbound interface, so as to update a related entry of a dual-uplink tangent ring on which the first port is located.

The processor 701 is further configured to discard the entry update packet when the first port is a non-conjugate port. In this way, the network device does not process the entry update packet if the first port is a non-conjugate port.

Optionally, if a deployed loop-breaking protocol is the SmartLink protocol, the entry update packet includes a first control virtual local area network identifier. Accordingly, the processor 701 is configured to acquire the first control virtual local area network identifier in the entry update packet, and determine whether the first control virtual local area network identifier is the same as a control virtual local area network identifier configured for the first port, when the first control virtual local area network identifier is the same as the control virtual local area network identifier configured for the first port, determine whether the first port is a conjugate port, when it is determined that the first port is a conjugate port, clear all MAC entries and ARP entries that use the first port as an outbound interface and clear all MAC entries that use a non-conjugate port as an outbound interface, in the MAC table and the ARP table of the network device, and initiate, on the first port and all non-conjugate ports of the network device, an ARP request for all ARP entries that use a non-conjugate port as an outbound interface, so as to update a related entry of the dual-uplink tangent ring on which the first port is located.

Further, optionally, the entry update packet further includes VLAN information, which may be a VLAN identifier. For example, a VLAN bitmap field of an extended Flush packet defined in the SmartLink protocol is used to carry one or more service VLAN identifiers that need to be updated.

If the entry update packet includes the VLAN information, when it is determined that the first port is a conjugate port, a clear/update operation is performed on a related entry of the dual-uplink tangent ring on which the first port is located, within all VLANs that are identified by the VLAN information in the entry update packet. If the entry update packet includes the VLAN information, the processor 701 is configured to when it is determined that the first port of the network device is a conjugate port, clear all MAC entries and ARP entries that use the first port of the network device as an outbound interface and clear all MAC entries that use a non-conjugate port of the network device as an outbound interface, among MAC entries and ARP entries of all VLANs that are identified by the VLAN information in the entry update packet, in the MAC table and the ARP table of the network device, and initiate, on the first port and all non-conjugate ports of the network device, an ARP request for all ARP entries that use a non-conjugate port as an outbound interface within all VLANs that are identified by the VLAN information in the entry update packet.

The processor 701 may further be configured to duplicate the entry update packet and forward it to a second network device. The processor 701 duplicates the entry update packet and forwards the duplicated entry update packet to the second network device from a second port of the network device and through a link connecting the network device and the second network device, that is, through a common tangent edge of a dual-uplink tangent ring.

The communication interface 703 may further include the second port.

Accordingly, the second network device receives, from a second port of the second network device, the entry update packet that is duplicated and forwarded by the network device. Because the second port of the second network device is a port on the common tangent edge of the dual-uplink tangent ring and is a non-conjugate port, the second network device discards the entry update packet.

A person skilled in the art should understand that this embodiment of the present invention shows merely a partial structure, which is related to the present invention, of the network device, and components not shown in this figure may further be included, or a different component arrangement may be used.

According to the network device provided in this embodiment, all ports that are related to multiple dual-uplink tangent rings and on the network device are classified into conjugate ports and non-conjugate ports. When receiving an entry update packet from a first port, a processor determines whether the first port is a conjugate port, and when it is determined that the first port is a conjugate port, clears all MAC entries and ARP entries that use the first port as an outbound interface and clears all MAC entries that use a non-conjugate port as an outbound interface, in a MAC table and an ARP table of the network device, retains MAC entries and ARP entries that use all other conjugate ports as outbound interfaces, and initiates, on the first port and all non-conjugate ports, an ARP request for all ARP entries that use a non-conjugate port as an outbound interface, so as to update a related entry of a dual-uplink tangent ring on which the first port is located, and the entry update packet is discarded without processing if it is determined that the first port is a non-conjugate port. In this way, a problem of traffic interruption can be avoided because a failure of one dual-uplink tangent ring does not cause an entry of one or more other normal dual-uplink tangent rings to be cleared/updated, and a problem of long-time service interruption can further be solved because a problem of many entry updates does not occur even when there are a large number of users.

Figure 8:
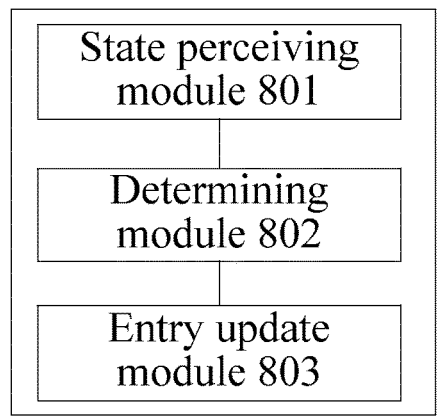
FIG. 8 and FIG. 9 are schematic structural diagrams of another network device according to an embodiment of the present invention.

An embodiment of the present invention provides another network device. As shown in FIG. 8, the network device includes a state perceiving module 801 configured to perceive a state change of a first port of the network device, and configured to perceive that a state of the first port of the network device changes from a blocked state to a forwarding state, a determining module 802 configured to determine whether the first port of the network device is a conjugate port, and an entry update module 803 configured to when it is determined that the first port of the network device is a conjugate port, clear all MAC entries and ARP entries that use the first port of the network device as an outbound interface and clear all MAC entries that use a non-conjugate port of the network device as an outbound interface, in a MAC table and an ARP table of the network device.

Figure 9:
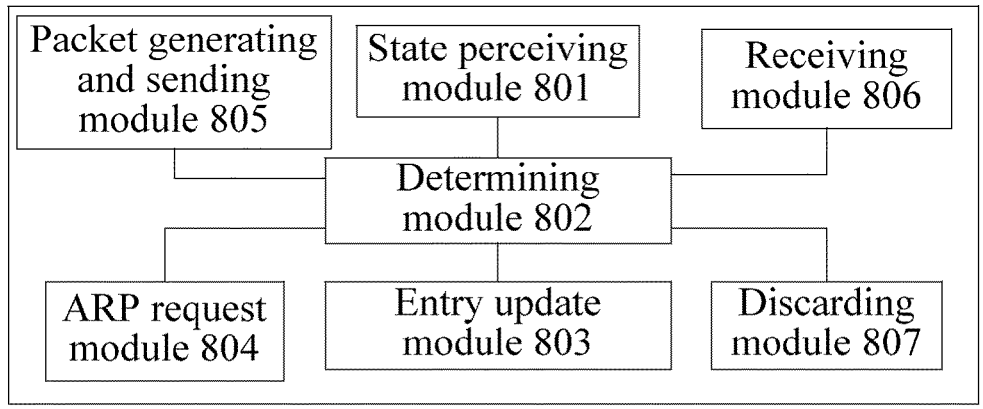

As shown in FIG. 9, the network device may further include an ARP request module 804 configured to when it is determined that the first port of the network device is a conjugate port, initiate, on the first port and all non-conjugate ports of the network device, an ARP request for all ARP entries that use a non-conjugate port of the network device as an outbound interface.

Optionally, as shown in FIG. 9, the network device further includes a packet generating and sending module 805 configured to generate a first entry update packet, such as an extended TC packet, and send the first entry update packet to a second network device, where the packet generating and sending module 805 is configured to generate the first entry update packet and send the generated first entry update packet to the second network device from a second port of the network device and through a link connecting the network device and the second network device, that is, through a common tangent edge of a dual-uplink tangent ring. Accordingly, the second network device receives the first entry update packet from a second port of the second network device. Because the second port of the second network device is a port on the common tangent edge of the dual-uplink tangent ring and is a non-conjugate port, the second network device discards the first entry update packet.

Optionally, the packet generating and sending module 805 is further configured to send the first entry update packet to a downstream network device, so that the downstream network device clears/updates a related entry, and the packet generating and sending module 805 is configured to send the first entry update packet to the downstream network device from the first port of the network device.

Further, the network device may further include a receiving module 806 and a discarding module 807.

The receiving module 806 is configured to receive a second entry update packet from a second port of the network device.

Further, the second network device perceives that a state of a first port of the second network device changes, that is, changes from the blocked state to the forwarding state, the second network device generates the second entry update packet and sends the generated second entry update packet to the network device from the second port of the second network device and through the link connecting the network device and the second network device, that is, the common tangent edge of the dual-uplink tangent ring, and the network device receives the second entry update packet from the second port of the network device.

Accordingly, the determining module 802 is further configured to determine whether the second port of the network device is a conjugate port.

The discarding module 807 is configured to discard the second entry update packet when it is determined that the second port of the network device is a non-conjugate port. Because the second port of the network device is a port on the common tangent edge of the dual-uplink tangent ring and is a non-conjugate port, the network device discards the second entry update packet.

According to the network device provided in this embodiment, all ports that are related to multiple dual-uplink tangent rings and on the network device are classified into conjugate ports and non-conjugate ports, when perceiving that a state of a first port changes to a forwarding state, the network device determines whether the first port is a conjugate port, and when it is determined that the first port is a conjugate port, clears all MAC entries and ARP entries that use the first port as an outbound interface and clears all MAC entries that use a non-conjugate port as an outbound interface, in a MAC table and an ARP table of the network device, retains MAC entries and ARP entries that use all other conjugate ports as outbound interfaces, and initiates, on the first port and all non-conjugate ports, an ARP request for all ARP entries that use a non-conjugate port as an outbound interface, so as to update a related entry of a dual-uplink tangent ring on which the first port is located, and the entry update packet is discarded without processing if it is determined that the first port is a non-conjugate port. In this way, a problem of traffic interruption can be avoided because a failure of one dual-uplink tangent ring does not cause an entry of one or more other normal dual-uplink tangent rings to be cleared/updated, and a problem of long-time service interruption can further be solved because a problem of many entry updates does not occur even when there are a large number of users.

Figure 10:
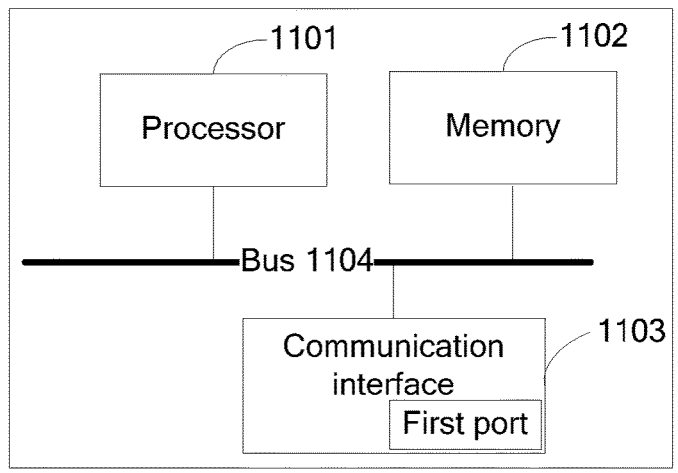
FIG. 10 is a schematic diagram of a hardware structure of another network device according to an embodiment of the present invention.

An embodiment of the present invention further provides a network device. As shown in FIG. 10, the network device includes a processor 1101, a memory 1102, a communication interface 1103, and a bus 1104, the processor 1101, the memory 1102, and the communication interface 1103 connect to each other through the bus 1104, and the bus may be an address bus, a data bus, a control bus, or the like. For ease of illustration, only one bold line is illustrated in FIG. 10 but this does not mean that there is only one bus or one type of bus.

The memory 1102 is configured to store a program. Further, the program may include program code, and the program code includes a computer operation instruction.

The communication interface 1103 is configured to connect to one or more other devices and communicate with the one or more other devices, and the communication interface 1103 includes at least a first port.

The processor includes a CPU, a NP, a DSP, an ASIC, a FPGA, a microprocessor, or the like. The memory includes a high-speed RAM or a NVM, for example, an EEPROM and a flash memory.

The processor 1101 executes the program stored in the memory 1102, so as to perceive a state change of the first port, determines whether the first port is a conjugate port, and when it is determined that the first port is a conjugate port, clears all MAC entries and ARP entries that use the first port as an outbound interface and clears all MAC entries that use a non-conjugate port of the network device as an outbound interface, in a MAC table and an ARP table of the network device.

The processor 1101 is further configured to when it is determined that the first port is a conjugate port, initiate, on the first port and all non-conjugate ports, an ARP request for all ARP entries that use a non-conjugate port as an outbound interface, so as to update a related entry of a dual-uplink tangent ring on which the first port is located.

The processor 1101 is further configured to perform no processing on the state change of the first port when the first port is a non-conjugate port.

The processor 1101 may be further configured to generate a first entry update packet and send the first entry update packet to a second network device, and the processor 1101 generates the first entry update packet, such as an extended TC packet, and sends the generated first entry update packet to the second network device from a second port of the network device and through a link connecting the network device and the second network device, that is, through a common tangent edge of a dual-uplink tangent ring.

The communication interface 1103 may further include the second port.

The processor 1101 may further be configured to send the first entry update packet to a downstream network device, so that the downstream network device clears/updates a related entry, the processor 1101 is configured to send the first entry update packet to the downstream network device from the first port.

Further, optionally, the processor 1101 is further configured to receive a second entry update packet from the second port, determine whether the second port is a conjugate port, and discard the second entry update packet when it is determined that the second port is a non-conjugate port.

A person skilled in the art should understand that this embodiment of the present invention shows merely a partial structure, which is related to the present invention, of the network device, and components not shown in this figure may further be included, or a different component arrangement may be used.

According to the network device provided in this embodiment, all ports that are related to multiple dual-uplink tangent rings and on the network device are classified into conjugate ports and non-conjugate ports, a processor perceives that a state of a first port changes to a forwarding state, determines whether the first port is a conjugate port, and when it is determined that the first port is a conjugate port, clears all MAC entries and ARP entries that use the first port as an outbound interface and clears all MAC entries that use a non-conjugate port as an outbound interface, in a MAC table and an ARP table of the network device, retains MAC entries and ARP entries that use all other conjugate ports as outbound interfaces, and initiates, on the first port and all non-conjugate ports, an ARP request for all ARP entries that use a non-conjugate port as an outbound interface, so as to update a related entry of a dual-uplink tangent ring on which the first port is located, and the entry update packet is discarded without processing if it is determined that the first port is a non-conjugate port. In this way, a problem of traffic interruption can be avoided because a failure of one dual-uplink tangent ring does not cause an entry of one or more other normal dual-uplink tangent rings to be cleared/updated, and a problem of long-time service interruption can further be solved because a problem of many entry updates does not occur even when there are a large number of users.

Figure 11:
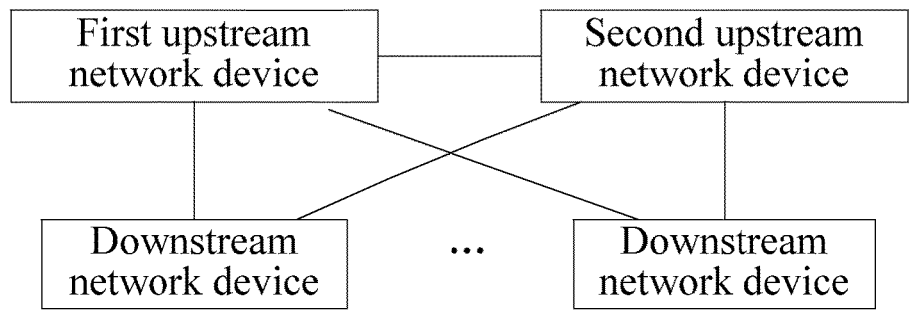
FIG. 11 is a schematic diagram of a dual-uplink tangent ring system according to an embodiment of the present invention.

An embodiment of the present invention further provides a dual-uplink tangent ring system. As shown in FIG. 11, the system includes a first upstream network device, a second upstream network device, and one or more downstream network devices, where the one or more downstream network devices are dual-linked to the first upstream network device and the second upstream network device, links to the first upstream network device and the second upstream network device form one or more dual-uplink tangent rings, and a link between the first upstream network device and the second upstream network device forms a common tangent edge of a dual-uplink tangent ring.

Ports that are related to multiple dual-uplink tangent rings and on the first upstream network device and the second upstream network device are classified into conjugate ports and non-conjugate ports, and the first upstream network device and the second upstream network device may maintain respective conjugate port sets.

The first upstream network device is configured to receive a first entry update packet from a first port of the first upstream network device or perceive that a state of a first port of the first upstream network device changes, determine whether the first port of the first upstream network device is a conjugate port, when it is determined that the first port of the first upstream network device is a conjugate port, clear all MAC entries and ARP entries that use the first port of the first upstream network device as an outbound interface and clear all MAC entries that use a non-conjugate port of the first upstream network device as an outbound interface, in a MAC table and an ARP table of the first upstream network device, and initiate, on the first port and all non-conjugate ports of the first upstream network device, an ARP request for all ARP entries that use a non-conjugate port of the first upstream network device as an outbound interface, so as to update a related entry of a dual-uplink tangent ring on which the first port is located, and when it is determined that the first port of the first upstream network device is a non-conjugate port, perform no processing on the first entry update packet, for example, discard the first entry update packet, or perform no processing on the state change of the first port.

The first upstream network device may further be configured to, after receiving the first entry update packet from the first port of the first upstream network device, duplicate the first entry update packet and forward it to the second upstream network device, or when perceiving that the state of the first port of the first upstream network device changes, generate a second entry update packet and send it to the second upstream network device, and forward the first entry update packet or the second entry update packet to the second upstream network device from a second port of the first upstream network device and through the link connecting the first upstream network device and the second upstream network device, that is, through the common tangent edge of the dual-uplink tangent ring.

The second upstream network device is configured to receive the first entry update packet or the second entry update packet from a second port of the second upstream network device, determine whether the second port of the second upstream network device is a conjugate port, and discard the first entry update packet or the second entry update packet when it is determined that the second port of the second upstream network device is a non-conjugate port. Further, because the second port of the second upstream network device is a port on the common tangent edge of the dual-uplink tangent ring and is a non-conjugate port, the second upstream network device discards the first entry update packet or the second entry update packet.

For example, in a scenario in which the second upstream network device is an active device and the first upstream network device is a standby device, when the first downstream network device perceives, using a loop-breaking protocol, that an active link from the first downstream network device to the second upstream network device is faulty, the first downstream network device is configured to change a standby link from the first downstream network device to the first upstream network device to an active state, that is, change a state of a standby uplink port of the first downstream network device from a blocked state to a forwarding state, and send the first entry update packet to the first port of the first upstream network device from the standby uplink port of the first downstream network device.

For a procedure and a principle of processing performed after the active link from the first downstream network device to the second upstream network device is recovered, reference may be made to the method embodiments of the present invention, and details are not described herein again.

Further, the first upstream network device and the second upstream network device may be as shown in any one of the embodiments illustrated in FIG. 5 to FIG. 10 of the present invention, and details are not described herein again.

According to the dual-uplink tangent ring system provided in this embodiment, all ports that are related to multiple dual-uplink tangent rings and on a first upstream network device and a second upstream network device are classified into conjugate ports and non-conjugate ports, the first upstream network device receives an entry update packet from a first port or perceives a state change of the first port, the first upstream network device determines whether the first port is a conjugate port, and when it is determined that the first port is a conjugate port, clears all MAC entries and ARP entries that use the first port as an outbound interface and clears all MAC entries that use a non-conjugate port as an outbound interface, in a MAC table and an ARP table of the first upstream network device, retains MAC entries and ARP entries that use all other conjugate ports as outbound interfaces, and initiates, on the first port and all non-conjugate ports, an ARP request for all ARP entries that use a non-conjugate port as an outbound interface, so as to update a related entry of a dual-uplink tangent ring on which the first port is located. In this way, a problem of traffic interruption can be avoided because a failure of one dual-uplink tangent ring does not cause an entry of one or more other normal dual-uplink tangent rings to be cleared/updated, and a problem of long-time service interruption can further be solved because a problem of many entry updates does not occur even when there are a large number of users.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A method for dual-uplink tangent ring convergence, the method comprising:
   receiving, by a first network device, an entry update packet from a first port of the first network device, or perceiving that a state of a first port of the first network device changes;
   clearing all entries that are in a media access control (MAC) table and an Address Resolution Protocol (ARP) table of the first network device and use the first port of the first network device as an outbound interface when the first port of the first network device is a conjugate port;
   clearing all MAC entries that are in the MAC table of the first network device and use a non-conjugate port of the first network device as an outbound interface; and
   initiating, on the first port and all non-conjugate ports of the first network device, ARP requests for all ARP entries that are in the ARP table of the first network device and use the non-conjugate port of the first network device as an outbound interface,
   wherein the conjugate port is an access-side port of the first network device,
   wherein one or more downstream devices are dual-linked to the first network device and a second network device, and
   wherein links to the first network device and the second network device form one or more dual-uplink tangent rings.

2. The method according to claim 1, wherein the entry update packet comprises virtual local area network (VLAN) information, wherein the clearing all the entries that are in the MAC table and the ARP table of the first network device and use the first port of the first network device as the outbound interface and clearing all the MAC entries that are in the MAC table of the first network device and use the non-conjugate port of the first network device as the outbound interface comprises:
   clearing all the entries that are identified by the VLAN information in the MAC table and the ARP table of the first network device and use the first port of the first network device as the outbound interface; and
   clearing all the MAC entries that are identified by the VLAN information in the MAC table of the first network device and use the non-conjugate port of the first network device as the outbound interface, and
   wherein initiating, on the first port and all non-conjugate ports of the first network device, ARP requests for all the ARP entries that are in the ARP table of the first network device and use the non-conjugate port of the first network device as the outbound interface comprises initiating, on the first port and all non-conjugate ports of the first network device, ARP requests for all ARP entries that are identified by the VLAN information in the ARP table of the first network device and use the non-conjugate port as the outbound interface.

3. The method according to claim 1, wherein the entry update packet is an extended Flush packet of a smart link protocol, wherein the extended Flush packet comprises a first control virtual local area network identifier, and wherein the method further comprises:
   acquiring, by the first network device, the first control virtual local area network identifier in the extended Flush packet before determining that the first port of the first network device is the conjugate port; and
   determining that the first control virtual local area network identifier is the same as the control virtual local area network identifier configured for the first port of the first network device.

4. The method according to claim 1, further comprising:
   duplicating, by the first network device, the entry update packet; and
   forwarding the entry update packet to a second port of the second network device.

5. The method according to claim 1, further comprising discarding the entry update packet or performing no processing on the state change of the first port when the first port of the first network device is the non-conjugate port.

6. A network device, comprising:
   a memory; and
   a processor coupled to the memory,
   wherein the memory comprises instructions that are configured to cause the processor to:
      receive an entry update packet from a first port of the network device;
      determine whether the first port of the network device is a conjugate port;
      clear all media access control (MAC) entries and Address Resolution Protocol (ARP) entries that use the first port of the network device as an outbound interface when the first port of the network device is the conjugate port; and
   clear all MAC entries that use a non-conjugate port of the network device as the outbound interface in a MAC table and an ARP table of the network device;
   duplicate the entry update packet and forward the duplicated entry update packet to a second network device; and
   discard the entry update packet when the first port of the network device is a non-conjugate port, and
   wherein the conjugate port is an access-side port of the first network device.

7. The network device according to claim 6, wherein the instructions are further configured to cause the processor to initiate, on the first port and all non-conjugate ports of the network device, ARP requests for all ARP entries that use the non-conjugate port of the network device as the outbound interface when the first port of the network device is the conjugate port.

8. The network device according to claim 7, wherein the entry update packet comprises virtual local area network (VLAN) information, wherein the instructions further cause the processor to:
clear all MAC entries and ARP entries that use the first port of the network device as the outbound interface when the first port of the network device is the conjugate port; and
clear all MAC entries that use the non-conjugate port of the network device as the outbound interface, among MAC entries and ARP entries of all VLANs that are identified by the VLAN information, in the MAC table and the ARP table of the network device, and
wherein the instructions further cause the processor to initiate, on the first port and all non-conjugate ports of the network device, ARP requests for all ARP entries that use the non-conjugate port as the outbound interface within all VLANs that are identified by the VLAN information when the first port of the network device is the conjugate port.

9. The network device according to claim 6, wherein the entry update packet is an extended Flush packet of a smart link protocol, wherein the extended Flush packet comprises a first control virtual local area network identifier, and wherein the instructions further cause the processor to:
acquire the first control virtual local area network identifier in the entry update packet;
determine whether the first control virtual local area network identifier is the same as a control virtual local area network identifier configured for the first port; and
determine whether the first port of the network device is a conjugate port when the second determining module determines that the first control virtual local area network identifier is the same as the control virtual local area network identifier configured for the first port.

10. A network device, comprising:
a memory; and
a processor coupled to the memory,
wherein the memory comprises instructions that are configured to cause the processor to:
perceive a state change of a first port of the network device;
determine whether the first port of the network device is a conjugate port;
clear all media access control (MAC) entries and Address Resolution Protocol (ARP) entries that use the first port of the network device as the outbound interface when the first port of the network device is the conjugate port;
clear all MAC entries that use a non-conjugate port of the network device as the outbound interface, in an MAC table and an ARP table of the network device; and
initiate, on the first port and all non-conjugate ports of the network device, ARP requests for all ARP entries that use the non-conjugate port of the network device as the outbound interface when the first port of the network device is the conjugate port, and wherein the conjugate port is an access-side port of the first network device.

11. The network device according to claim 10, wherein the instructions further cause the processor to:
generate a first entry update packet; and
send the first entry update packet to a second network device.

12. The network device according to claim 10, wherein the instructions further cause the processor to:
receive a second entry update packet from a second port of the network device; and
determine whether the second port of the network device is the conjugate port.

13. A dual-uplink tangent ring system, comprising:
a first upstream network device,
a second upstream network device, and
one or more downstream network devices,
wherein the one or more downstream network devices are dual-linked to the first upstream network device and the second upstream network device,
wherein links to the first upstream network device and the second upstream network device form one or more dual-uplink tangent rings,
wherein a conjugate port is an access-side port among ports that are related to the one or more dual-uplink tangent rings and on the first upstream network device and the second upstream network device,
wherein the first upstream network device is configured to:
receive a first entry update packet from a first port of the first upstream network device or perceive that a state of a first port of the first upstream network device changes;
determine whether the first port of the first upstream network device is a conjugate port;
clear all entries that are in a media access control (MAC) table and an Address Resolution Protocol (ARP) table of the first upstream network device and use the first port of the first upstream network device as an outbound interface when the first port of the first upstream network device is a conjugate port;
clear all MAC entries that are in the MAC table of the first upstream network device and use a non-conjugate port of the first upstream network device as an outbound interface, in a MAC table and an ARP table of the first upstream network device; and
initiate, on the first port and all non-conjugate ports of the first upstream network device, ARP requests for all ARP entries that are in the ARP table of the first upstream network device and use the non-conjugate port of the first upstream network device as the outbound interface, so as to update a related entry of a dual-uplink tangent ring on which the first port is located.

14. The system according to claim 13, wherein the first upstream network device is further configured to duplicate the first entry update packet and forward the first entry update packet to the second upstream network device after receiving the first entry update packet from the first port of the first upstream network device, and wherein the second upstream network device is configured to:
receive the first entry update packet from a second port of the second upstream network device; and
determine whether the second port of the second upstream network device is a conjugate port.

15. The system according to claim 13, wherein the first upstream network device is further configured to:
generate a second entry update packet when perceiving that the state of the first port of the first upstream network device changes; and
send the second entry update packet to the second upstream network device, and
wherein the second upstream network device is configured to:
receive the second entry update packet from a second port of the second upstream network device; and determine whether the second port of the second upstream network device is a conjugate port.

16. The system according to claim 13, wherein the first downstream network device is configured to send the first entry update packet to the first port of the first upstream network device.

17. A first network device, comprising computing hardware configured to:
receive an entry update packet from a first port of the first network device, or perceiving that a state of a first port of the first network device changes;
clear all entries that are in a media access control (MAC) table and an Address Resolution Protocol (ARP) table of the first network device and use the first port of the first network device as an outbound interface when the first port of the first network device is a conjugate port;
clear all MAC entries that are in the MAC table of the first network device and use a non-conjugate port of the first network device as an outbound interface; and
initiate on the first port and all non-conjugate ports of the first network device, ARP requests for all ARP entries that are in the ARP table of the first network device and use the non-conjugate port of the first network device as an outbound interface,
wherein the conjugate port is an access-side port of the first network device,
wherein one or more downstream devices are dual-linked to the first network device and a second network device, and
wherein links to the first network device and the second network device form one or more dual-uplink tangent rings.

18. The first network device according to claim 17, wherein the entry update packet comprises virtual local area network (VLAN) information, and wherein the computing hardware is configured to:
clear all the entries that are identified by the VLAN information in the MAC table and the ARP table of the first network device and use the first port of the first network device as the outbound interface;
clear all the MAC entries that are identified by the VLAN information in the MAC table of the first network device and use the non-conjugate port of the first network device as the outbound interface; and
initiate on the first port and all non-conjugate ports of the first network device, ARP requests for all ARP entries that are identified by the VLAN information in the ARP table of the first network and use the non-conjugate port as the outbound interface.

19. The first network device according to claim 17, wherein the entry update packet is an extended Flush packet of a smart link protocol, wherein the extended Flush packet comprises a first control virtual local area network identifier, and wherein the computing hardware is configured to:
acquire the first control virtual local area network identifier in the extended Flush packet; and
determine that the first port of the first network device is the conjugate port based on the first control virtual local area network identifier is the same as the control virtual local area network identifier configured for the first port of the first network device.

20. The first network device according to claim 17, wherein the computing hardware is configured to:
duplicate the entry update packet; and
forward the entry update packet to a second port of the second network device.

21. The first network device according to claim 17, wherein the computing hardware is configured to discard the entry update packet or perform no processing on the state change of the first port when the first port of the first network device is the non-conjugate port.

* * * * *